A. GONELLA.
FIRELESS COOKER.
APPLICATION FILED FEB. 8, 1907.

933,550.

Patented Sept. 7, 1909.

Witnesses:

Inventor.
Angelo Gonella
By B. Singer
Atty.

UNITED STATES PATENT OFFICE.

ANGELO GONELLA, OF VIGEVANO, ITALY.

FIRELESS COOKER.

933,550.

Specification of Letters Patent. Patented Sept. 7, 1909.

Application filed February 8, 1907. Serial No. 356,403.

*To all whom it may concern:*

Be it known that I, ANGELO GONELLA, a subject of the King of Italy, residing at Vigevano, Italy, have invented a certain new and useful Fireless Cooker, of which the following is a specification.

The present invention has for its object a heat and cold resisting receptacle adapted to maintain high or low temperatures, and which according to the use to which it is to be put may be constructed transportable or fixed.

Figure 1:
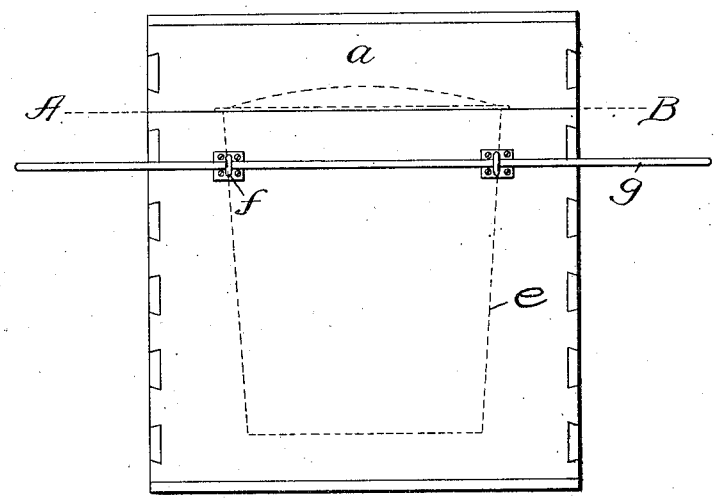
Figure 2:
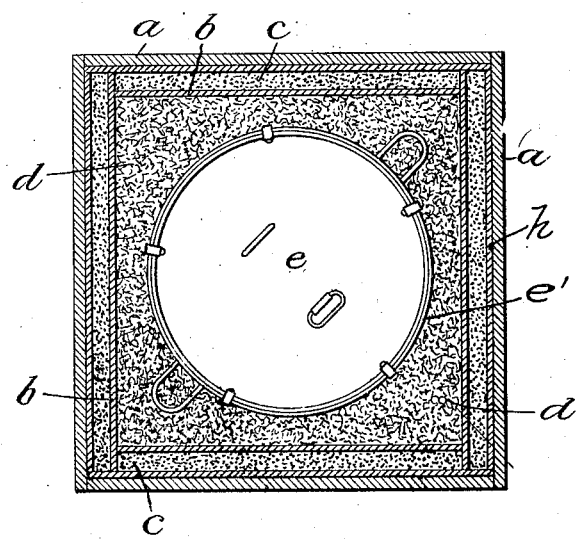

The invention is illustrated in one of its most simple forms of construction in the accompanying drawing, in which:

Figure 1 is an elevation of the receptacle containing a vessel of any kind in which there is placed a liquid, food stuff or the like which is required to be kept at a low or at a high temperature as the case may be. Fig. 2 is a view on the line A—B of Fig. 1.

The heat or cold preserving receptacle is formed of double walls of wood or of metal $a$ and $b$. In its interior the space $c$ between the outer wall $a$ and the movable inner wall $b$ is filled with sawdust or chopped straw or ground material or chips, while the space $d$ between the internal movable wall $b$ and the reservoir $e$ is filled with tow or some similar substance which is kept in place in contact with the vessel which it is adapted to surround by means of felt or textile material $e'$ of some kind. This textile may be of asbestos, wool, felt, or be formed of any other substance adapted to hold securely the filling which constitutes the heat or cold retaining envelop. Whatever the kind of vessel whether cylindrical or polygonal, it has no influence upon the result to be obtained.

If the device or apparatus of my invention is designed for portable use or service rods $g$ may be secured to the sides of the receptacle $a$ by clips $f$.

The inner wall $b$ is preferably removable and is composed of a plurality of separate parts as clearly shown in Fig. 2. In the construction shown a lining wall is provided which lies adjacent the outer wall $a$ and said lining wall is composed of a plurality of separate disks $h$. In the arrangement shown two sections of the inner wall engage the lining wall and form oppositely disposed closed chambers and two pieces engage said inner wall and form therewith oppositely disposed closed chambers. The insulating material is placed in the chambers formed by said inner and lining walls.

Having now fully described my said invention and the manner in which the same is to be performed, what I claim and desire to secure by Letters Patent of the United States of America is:—

1. An apparatus of the class described comprising in combination an outer casing or receptacle, a lining wall for said receptacle composed of a plurality of separate pieces, a removable inner wall spaced apart from said lining wall and composed of a plurality of separate parts, heat insulating material filling the space between said lining and inner wall, a food receptacle within said inner wall, and heat insulating material between said inner wall and said food receptacle.

2. An apparatus of the class described comprising in combination, an outer casing or receptacle, a lining wall for said receptacle composed of a plurality of separate pieces, a removable inner wall spaced apart from said lining wall and composed of a plurality of separate parts, heat insulating material filling the space between said lining and inner wall, a food receptacle within said inner wall, heat insulating material between said inner wall and said food receptacle, and a covering of textile material for said food receptacle interposed between the same and said last mentioned material.

3. An apparatus of the class described comprising in combination, an outer rectangular casing or receptacle, a lining wall for said receptacle composed of a plurality of separate pieces, a removable inner wall providing spaces between the same and said lining wall, said inner wall comprising two parts engaging the lining wall and forming oppositely disposed closed chambers and two pieces engaging said inner wall pieces and forming therewith oppositely disposed closed chambers, heat insulating material filling chambers formed by said inner and lining walls, a food receptacle within said inner wall, a textile covering for said food receptacle, and heat insulating material between said inner wall and said covering.

In testimony whereof I have affixed my signature in presence of two witnesses.

ANGELO GONELLA.

Witnesses:
 ERNEST SANTI,
 B. CARLO SALVOTI.